United States Patent [19]

Handlin, Jr. et al.

[11] Patent Number: 5,376,745

[45] Date of Patent: Dec. 27, 1994

[54] LOW VISCOSITY TERMINALLY FUNCTIONALIZED ISOPRENE POLYMERS

[75] Inventors: Dale L. Handlin, Jr., Houston; Robert C. Bening, Katy; Carl L. Willis, Houston, all of Tex.

[73] Assignee: Shell Oil Company, Houston, Tex.

[21] Appl. No.: 160,341

[22] Filed: Dec. 1, 1993

[51] Int. Cl.$^5$ .............. C08F 4/58; C08F 4/48; C08F 136/08

[52] U.S. Cl. .................. 526/178; 526/194; 526/335; 526/340.2

[58] Field of Search .............. 526/178, 194, 335, 336, 526/340.2

[56] References Cited

U.S. PATENT DOCUMENTS

| | | |
|---|---|---|
| Re. 27,145 | 6/1971 | Jones . |
| 4,417,029 | 11/1983 | Milkovich . |
| 4,518,753 | 5/1985 | Richards et al. . |
| 4,753,991 | 6/1988 | Bronstert . |
| 4,791,174 | 12/1988 | Bronstert et al. . |
| 4,970,254 | 11/1990 | Willis et al. . |
| 5,166,277 | 11/1992 | Goodwin et al. . |

FOREIGN PATENT DOCUMENTS

91/12277 8/1991 WIPO .

*Primary Examiner*—Fred Zitomer
*Attorney, Agent, or Firm*—Keith M. Tackett

[57] ABSTRACT

The anionic polymerization of isoprene with monolithium initiators and functionalized initiators having the structure $R^1R^2R^3Si$—O—A'—Li wherein $R^1$, $R^2$, and $R^3$ are preferably alkyl, alkoxy, aryl, or alkaryl groups having from 1 to 10 carbon atoms, and A' is preferably a branched or straight chain bridging group having at least 2 carbon atoms produces unsaturated and hydrogenated isoprene polymers having high 1,4-addition of the isoprene, from about one to two terminal functional groups per molecule, and low viscosity.

11 Claims, 1 Drawing Sheet

○ PFI PROTECTED (mono-ol)
○ PFI DEPROTECTED (diol)
▽ KURARAY TH1, TH21
◇ ATOCHEM EPOL ○ PFI PROTECTED (mono-ol)
○ PFI DEPROTECTED (diol)
▽ DI-INITIATED DIOL

LOW VISCOSITY TERMINALLY FUNCTIONALIZED ISOPRENE POLYMERS

FIELD OF THE INVENTION

This invention relates to anionic polymerization of monomers and to functionalized polymers used as components in adhesives, sealants and coatings.

BACKGROUND OF THE INVENTION

Anionic polymerization of conjugated dienes with lithium initiators, such as sec-butyllithium, and hydrogenation of residual unsaturation has been described in many references including U.S. Pat. No. Re. 27,145. The capping of living anionic polymers to form functional end groups is described in U.S. Pat. Nos. 4,417,029, 4,518,753, and 4,753,991. Of particular interest for the present invention are anionic polymers that are capped on one or more ends with hydroxyl, carboxyl, phenol, epoxy, and amine groups.

Anionic polymerization using protected functional initiators having the structure $R^1R^2R^3Si$—O—A'—Li is described in WO 91/12277 wherein $R^1$, $R^2$, and $R^3$ are preferably alkyl, alkoxy, aryl, or alkaryl groups having from 1 to 10 carbon atoms, and A' is preferably a branched or straight chain bridging group having at least 2 carbon atoms. The bridging group is most preferably straight chain alkyl having from 3 to 10 carbon atoms and is exemplified by the following compound:

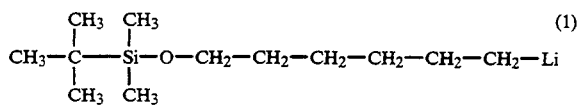

(1)

which is readily prepared by lithiation of the reaction product of 1-chloro-6-hydroxy-n-hexane and t-butyldimethylchlorosilane.

Monofunctional and telechelic polymers produced by anionic polymerization of dienes and vinyl aromatic monomers typically have narrow molecular weight distributions in comparison to the broad molecular weight distributions usually achieved by polymerization of these monomers by non-anionic mechanisms such as free radical, cationic, Ziegler-Natta, etc. Number average molecular weights are preferred for the comparison of most functionally terminated polymers because they are reacted in stoichiometric amounts with crosslinking and chain extension agents such as poly- and di-functional isocyanates. The absence of very high molecular weight components in polymers produced by anionic polymerization results in low viscosities for a given number average molecular weight. Low viscosities are desirable in functionally terminated polymers for applications such as paints and coatings because they allow formulation with a minimum amount of solvent and/or elevated temperature to reach application viscosities.

Amorphous, low glass transition temperature polymers such as polydienes are advantageous for coatings applications because of their low viscosities. Hydrogenated dienes are particularly advantaged for applications that require good weatherability and hydrolytic stability. Hydrogenated isoprene is advantaged over hydrogenated polybutadiene because it does not crystallize and is, therefore, transparent. Hydrogenated isoprene polymers have lower viscosities than high 1,4-addition hydrogenated polybutadiene diols such as POLYTAIL H made by Mitsubishi which is a solid at room temperature. Although low 1,4-addition polybutadienes such as G-2000 made by Nisso or Polytail-HA made by Mitsubishi are transparent, they have high glass transition temperatures and high viscosities.

It is also desirable to avoid the presence of molecules with more than two functional groups to avoid crosslinking in applications such as thermoplastic polyurethanes and modification of polycarbonates and polyesters. Anionic polymerization using a protected functional initiator followed by end capping assures that no molecules have functionality greater than two, unlike radical polymerizations which have broad distributions of functionality.

Telechelic hydrogenated isoprene polymers having number average molecular weights from 2,500 to 5,500 are commercially available from Atochem under the name EPOL and Kuraray, TH-21 and TH-1, but all known commercial products have polydispersities ($M_w/M_n$ or Q) greater than 2, viscosities higher than 500 poise at 25° C., and average functionalities greater than 2.0. It is an object of the present invention to provide improved monofunctional and telechelic unsaturated and hydrogenated isoprene polymers having low viscosity.

SUMMARY OF THE INVENTION

The present invention includes the discovery that monofunctional and telechelic unsaturated and hydrogenated isoprene polymers having number average molecular weights from 1,000 to 15,000 have surprisingly lower viscosities than previously available monofunctional and telechelic isoprene polymers when the polymers have greater than 80% 1,4-addition and a polydispersity less than 2.

DETAILED DESCRIPTION OF THE INVENTION

The present invention comprises linear unsaturated or hydrogenated isoprene polymers having number average molecular weights from 1,000 to 20,000, greater than 80% 1,4-addition of the isoprene, a polydispersity less than 2, and from about one to two terminal functional groups per molecule. Preferably, the isoprene polymers have number average molecular weights from 1,000 to 9,000, greater than 90% 1,4-addition of the isoprene, a polydispersity less than 1.5, and hydrogenation of at least 90% of the polymerized isoprene. The polymers are prepared by anionic polymerization in the absence of microstructure modifiers that increase 3,4-addition of the isoprene.

The anionic polymerization of unsaturated monomers with initiators such as s-butyllithium is well known. The use of functionalized initiators having the structure

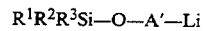

is described in WO 91/12277 wherein $R^1$, $R^2$, and $R^3$ are preferably alkyl, alkoxy, aryl, or alkaryl groups having from 1 to 10 carbon atoms, and A' is preferably a branched or straight chain bridging group having at least 2 carbon atoms, preferably linear alkyls having from 3 to 10 carbon atoms. The use of such an initiator to polymerize the desired monomer(s), followed by capping to produce the second terminal functional group, has several advantages over difunctional initiators such as 1,4 dilithiobutane and lithium naphthalide. In addition to providing the option of polymerizing in non-polar solvents, this route avoids the formation of ionic gels, which are known to occur when diinitiated polymers are capped with reagents such as ethylene oxide, generating the polymeric di-alkoxide. These gels form even in relatively polar solvent mixtures and greatly complicate subsequent processing steps. By capping to produce the alkoxide on only one polymer terminus, these gels are avoided.

Figure 2:
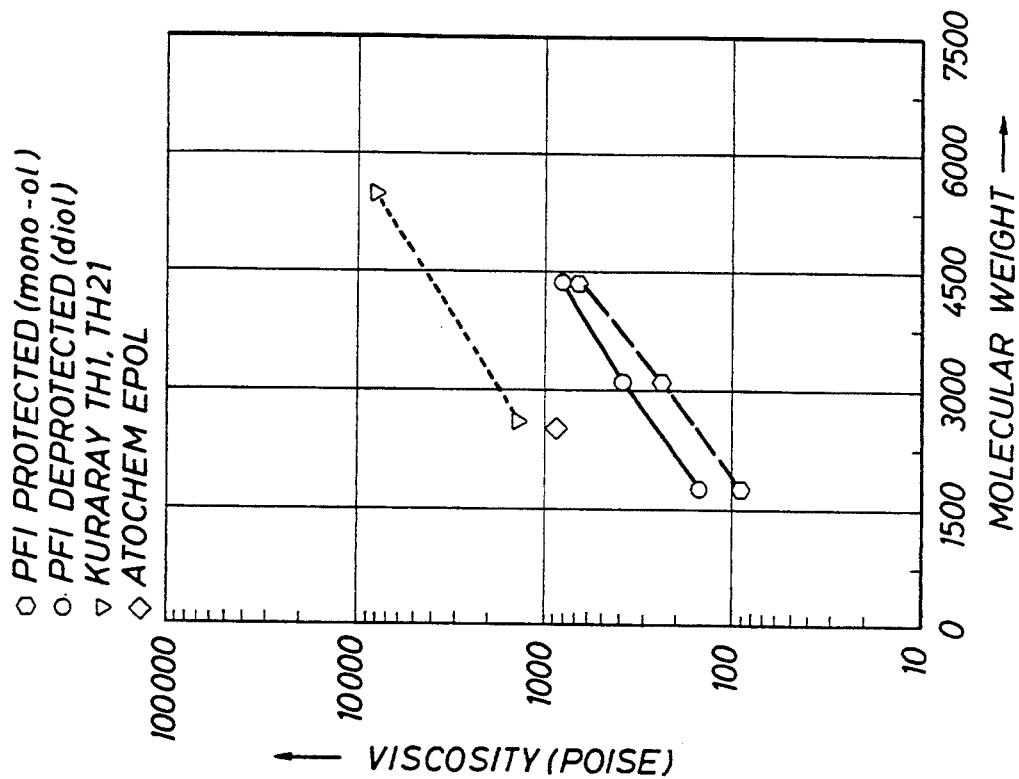
FIG. 2 illustrates the surprising reduction in viscosity for hydrogenated isoprene diols of the present invention in comparison to previously available hydrogenated isoprene diols.
Figure 1:
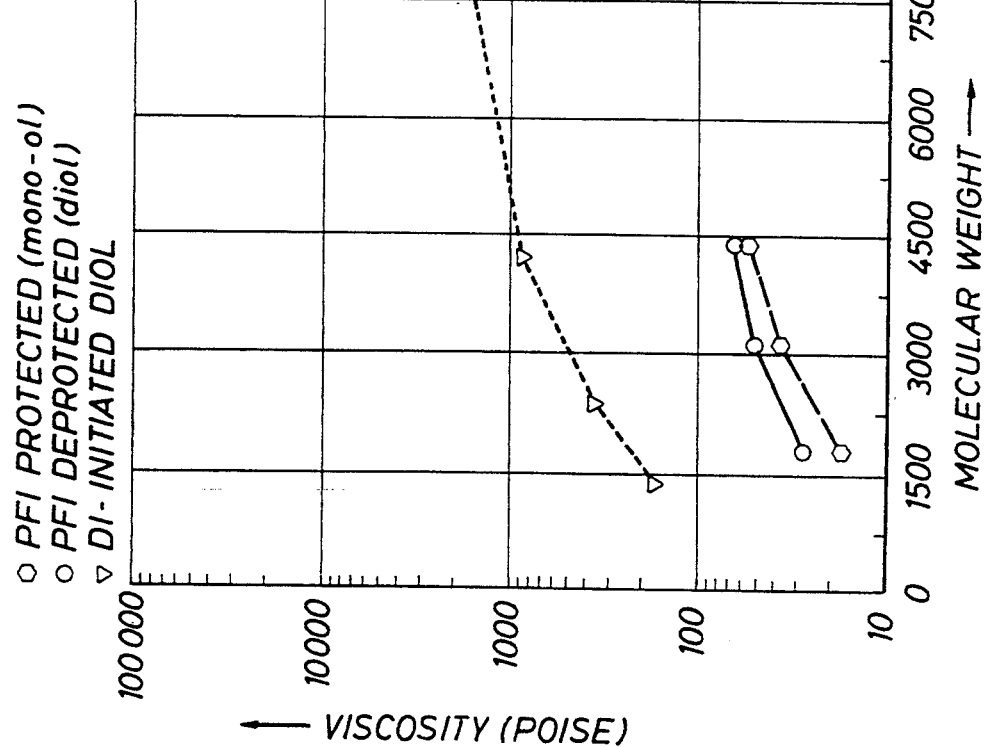
FIG. 1 illustrates the surprising reduction in viscosity for unsaturated isoprene diols of the present invention in comparison to similar polymers having different microstructure.

The isoprene polymers of the present invention have surprisingly lower viscosities than previously available linear isoprene polymers having from about one to two terminal functional groups per molecule as shown in FIGS. 1 and 2 which are described in more detail below.

Functionalized lithium initiators having the structure:

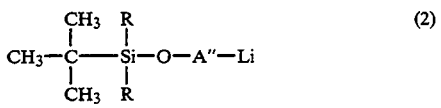
(2)

wherein each R is methyl ethyl, n-propyl, or n-butyl and A" is an alkyl-substituted or non-substituted propyl bridging group, including —CH$_2$—CH$_2$—CH$_2$— (1,3-propyl), —CH$_2$—CH(CH$_3$)—CH$_2$— (2-methyl-1,3-propyl) and —CH$_2$—C(CH$_3$)$_2$—CH$_2$— (2,2-dimethyl-1,3-propyl), or an alkyl-substituted or non-substituted octyl bridging group such as —CH$_2$—CH$_2$—CH$_2$—CH$_2$—CH$_2$—CH$_2$—CH$_2$—CH$_2$— (1,8-octyl) initiate polymerization of unsaturated monomers at surprisingly higher polymerization temperatures with surprisingly lower amounts of dead initiator (higher efficiency) than similar initiators wherein A" is replaced by alkyl-substituted or non-substituted butyl, pentyl, or hexyl bridging groups, such as —CH$_2$—CH$_2$—CH$_2$—CH$_2$— (1,4-butyl), —CH$_2$—CH$_2$—CH$_2$—CH$_2$—CH$_2$— (1,5-pentyl), or —CH$_2$—CH$_2$—CH$_2$—CH$_2$—CH$_2$—CH$_2$— (1,6-hexyl). For the purpose of this description, the number of carbon atoms in the bridging group refers to the carbons spanning the oxygen and lithium; i.e. alkyl branches on the bridging alkyl carbons, such as the methyl groups on the 2,2-dimethyl-1,3-propylene segment, are not counted.

In Structure (2), each R is preferably methyl and any alkyl branching on A" is preferably methyl. Substituents other than alkyl groups may be useful for R and as branching on A", however the effect on initiation efficiency and polymerization temperature would have to be determined by experiments.

The preferred initiators of Structure (2) are similar to s-butyllithium with regard to operating temperature although initiation of isoprene with Structure (2) results in higher amounts of dead initiator than initiation with s-butyllithium. However the initiators of the invention have the advantage of placing a silyl ether group at the start of the polymer chain which serves as a "masked"

or "protected" alcohol, capable of conversion to a primary alcohol group after polymerization is completed, as described in WO 91/12277. The polymer chains may be terminated, endcapped, or coupled by conventional means to end the polymerization and provide one or more terminal functional groups on linear isoprene polymers having high 1,4-addition of the isoprene.

The living polymers can be terminated by reaction with methanol, reacted with a capping agent such as ethylene oxide, or dimerized by treatment with a coupling agent such as dibromomethane. In the present invention, the linear polymers have an initial terminal silyl ether group prior to termination, capping, or coupling of the polymer. Cleavage of the silyl ether leaves a primary alcohol group in this position.

The preferred initiators of Structure (2) are very active at room temperature and polymerization is preferably initiated at a temperature from 20° C. to 60° C., most preferably from 20° C. to 40° C. It is generally advisable to keep the polymerization temperature below about 100° C.; above this temperature, side reactions that change microstructure and limit capping efficiency may become important. Polymerizations can be carried out over a range of solids, from about 5% to about 40%. For high solids polymerizations, it is preferable to add the monomer in increments to avoid exceeding the desired polymerization temperature. If the initiator is to be added to the full monomer charge, it is preferable to run the polymerization between 10% and 20% solids.

Anionic polymerization is often terminated by addition of water to remove the lithium as lithium hydroxide (LiOH) or by addition of an alcohol (ROH) to remove the lithium as a lithium alkoxide (LiOR). Polymers prepared from initiators of the present invention and terminated in this way will be mono-hydroxy functional (mono-ols) after removal of the silyl protecting group. To prepare polymers having an additional terminal functional groups, the living polymer chains are preferably terminated with hydroxyl, carboxyl, phenol, epoxy, or amine groups by reaction with ethylene oxide, oxetane, 2,2-dimethyloxetane, carbon dioxide, a protected hydroxystyrene monomer, ethylene oxide plus epichlorohydrin, or the amine compounds listed in U.S Pat. No. 4,791,174, respectively. For the preparation of telechelic diols, the preferred process is to terminate with 1–10 equivalents, most preferably 1–2 equivalents, of ethylene oxide at 30° C.–50° C. This reaction is quite rapid; reaction times from 5 to 30 minutes yield acceptable results.

The termination step can result in release of fine particles of lithium bases as described in U.S. Pat. No. 5,166,277 which is incorporated by reference herein. The lithium bases may interfere with hydrogenation of the polymer and preferably are removed, especially if the hydrogenation is to be carried out at high solids.

Termination with carbon dioxide results in carboxylate salt groups that reduce hydrogenation catalyst activity as described in U.S. Pat. No. 4,970,254 which disclosure is incorporated by reference herein. Improved hydrogenation is obtained by converting the carboxylate salt groups to ester groups prior to hydrogenation and then reconverting to carboxylate salt or carboxylic acid groups after hydrogenation.

Hydrogenation of at least 90%, most preferably at least 95%, of the unsaturation in low molecular weight isoprene polymers is achieved with nickel catalysts as described in U.S. Pat. No. Re. 27,145 and U.S. Pat. No. 4,970,254 and U.S. patent application Ser. No. 07/785,715, now U.S. Pat. No. 5,166,277, which are incorporated by reference herein. The preferred nickel catalyst is a mixture of nickel 2-ethylhexanoate and triethylaluminum described in more detail in the examples. Large amounts of catalyst are needed to hydrogenate polyisoprene having low 3,4 addition and it is preferable to extract the nickel catalyst after hydrogenation by stirring the polymer solution with aqueous phosphoric acid (20–30 percent by weight), at a volume ratio of 0.5 parts aqueous acid to 1 part polymer solution, at about 50° C. for 30–60 minutes while sparging with a mixture of oxygen in nitrogen. This step is also described in more detail in the examples.

Saturated or unsaturated conjugated diene polymers having from about one to two terminal functional group selected from hydroxyl, carboxyl, phenol, epoxy, and amine groups can be used without solvents when the viscosity of the polymer is less than about 500 poise at mixing and application temperature. Linear unsaturated isoprene polymers having two terminal hydroxyl groups per molecule and lower viscosity than 500 poise at mixing and application temperatures are produced by limiting the number average molecular weight to a range from about 1,000 to 20,000 and by limiting the 3,4-addition of hydrogenated isoprene to an amount below 20%, preferably below 10%. Linear hydrogenated isoprene polymers having two terminal hydroxyl groups per molecule and lower viscosity than 500 poise at mixing and application temperatures are produced by limiting the number average molecular weight to a range from about 1,000 to 9,000 and by limiting the 3,4-addition of hydrogenated isoprene to an amount below 20%, preferably below 10%.

After polymerization and, optionally, hydrogenation and washing of the polymer, any silyl group at the front of the polymer chain may be retained to provide a monofunctional polymer with a protected hydroxyl group that may be reactive during final application. Optionally, the silyl group at the front of the chain can be removed to generate the desired primary hydroxyl functional group. This step is often referred to as deprotection. A variety of processes for removal of the silyl protecting group are known; for a review, see T. W. Greene, "Protective Groups in Organic Synthesis", J. Wiley and Sons, New York, 1981, incorporated herein by reference. A preferable process would involve easily handled, relatively low toxicity, and inexpensive reagents. In a preferred process, the silyl group is removed by reaction of the polymer solution with 1–5 equivalents (basis silyl end groups) of a strong organic acid, preferably methanesulfonic acid (MSA), in the presence of 0.1% to 2% by weight of water and 5% to 20% by volume of isopropanol (IPA) at about 50° C. Essentially complete conversion to the alcohol was observed for polymers produced using initiators that lacked $\beta$ branching, such as Structure (2) having a 1,3-propylene bridging group, in 30 minutes to 3 hours. Polymers produced from Structure (2) having a 2,2-dimethyl-1,3-propylene bridging group (possesses two methyl groups $\beta$ to the silanol) required reaction times on the order of 24 hours to achieve comparable conversion under these conditions. Polymers prepared from an initiator of Structure (2) with a 2-methyl-1,3-propylene bridging group (possesses one methyl group $\beta$ to the silanol) would should be intermediate in with respect to ease of deprotection.

Sufficient IPA must be present during deprotection to prevent the formation of a discrete aqueous phase. Excess acid is then removed by washing with dilute aqueous base, preferably 0.1N–0.5N sodium hydroxide or potassium carbonate, followed by water.

For some applications, such as coatings prepared by baked cures of the polymer with amino resins in the presence of a strong organic acid catalyst, it may be preferable to use the polymer in its "protected" form. The viscosity of the protected polymer is lower and conditions such as those described above should accomplish the deprotection (generate the alcohol) during the cure.

The conjugated diene polymers produced as described above have the conventional utilities for terminally functionalized polymers of such as forming adhesives, coatings, and sealants and in polymer modification.

DETAILED DESCRIPTION OF PREFERRED EMBODIMENTS

The most preferred products are linear isoprene homopolymers having number average molecular weights from 1,500 to 4,500, greater than 90% 1,4-addition of the isoprene, hydrogenation of at least 95% of the polymerized isoprene, and from 1.6 to 2.0 terminal hydroxyl groups per molecule.

The dihydroxylated polymers are preferably produced by initiation with a lithium initiator having Structure (2) wherein A" is a non-substituted alkyl bridging group having 3 or 8 alkyl carbons. Most preferably the lithium initiator has the structure

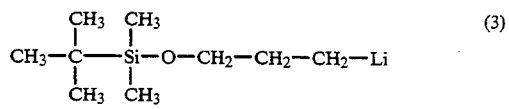

which is produced by silylation of 3-chloro-1-propanol, followed by reaction with lithium metal. After polymerization of the desired amount of isoprene, the living polymer is capped with ethylene oxide and reacted with methanol to give a terminal primary alcohol group. The silyl group is then converted to a hydroxyl group by reaction with MSA in the presence of water and IPA.

The preferred polymers of the present invention are useful in adhesives (including pressure sensitive adhesives, contact adhesives, laminating adhesives and assembly adhesives), sealants (such as urethane architectural sealants, etc.), coatings (such as topcoats for automotive, epoxy primers for metal, polyester coil coatings, alkyd maintenance coatings, etc.), films (such as those requiring heat and solvent resistance), molded and extruded thermoplastic and thermoset parts (for example thermoplastic injection molded polyurethane rollers or reaction injection molded thermoset auto bumper, facie, etc.), fibers (such as thermoplastic urethanes and polyamides) and polymer modification (for polyesters and polycarbonates).

A composition of the instant invention may contain plasticizers, such as rubber extending plasticizers, or compounding oils or organic or inorganic pigments and dyes. Rubber compounding oils are well-known in the art and include both high saturates content oils and high aromatics content oils. Preferred plasticizers are highly saturated oils, e.g. Tufflo ® 6056 and 6204 oil made by Arco and process oils, e.g. Shellflex ® 371 oil made by Shell. The amounts of rubber compounding oil employed in the invention composition can vary from 0 to about 500 phr, preferably between about 0 to about 100 phr, and most preferably between about 0 and about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the composition.

Various types of fillers and pigments can be included in the coating or sealant formulation. This is especially true for exterior coatings or sealants in which fillers are added not only to create the desired appeal but also to improve the performance of the coatings or sealant such as its weatherability. A wide variety of fillers can be used. Suitable fillers include calcium carbonate, clays, talcs, silica, zinc oxide, titanium dioxide and the like. The amount of filler usually is in the range of 0 to about 65% w based on the solvent free portion of the formulation depending on the type of filler used and the application for which the coating or sealant is intended. An especially preferred filler is titanium dioxide.

The dihydroxylated conjugated diene polymers of the present invention may also be blended with other polymers to improve their impact strength and/or flexibility. Such polymers are generally condensation polymers including polyamides, polyurethanes, vinyl alcohol polymers, vinyl ester polymers, polysulfones, polycarbonates and polyesters, including those, like polylactones, which have a recurring ester linkage in the molecule, and those, like polyalkylene arylates, including polyalkylene terephthalates, having a structure formed by polycondensation of a dicarboxylic acid with a glycol. The blends may be made in the reactor or in a post compounding step.

The present invention is further described by the following examples which include the best mode for making a dihydroxylated, saturated isoprene homopolymer (EP Diol). The examples are not intended to limit the present invention to specific embodiments although each example may support the patentability of a specific claim.

INITIATOR SYNTHESIS

A functionalized initiator was prepared in dry cyclohexane by reaction of 3-chloro-1-propanol with t-butyldimethylsilyl chloride (TBDMS-Cl) in the presence of imidazole, followed by reaction with lithium metal, as described in WO 91 112277. The concentration of active lithium alkyl was determined by titration with diphenylacetic acid, as described by W. G. Korfron and L. M. Baclawski (*J. Org. Chem*, 41(10), 1879 (1976)).

EXAMPLE 1

A linear isoprene polymer and its hydrogenated analogue having about two terminal hydroxyl groups per molecule, a number average molecular weight of 4,350, a 1,4-addition of isoprene of 95.8%, and a residual unsaturation of 0.47 meq/g (96% hydrogenated) is prepared as described below: 450 g. (6.6 moles) of isoprene and 4050 g. of cyclohexane were charged into a 2 gal. stainless steel autoclave. The reactor was heated to 30° C. and 172 g. of a 11.7% wt. solution of protected functional initiator described above in cyclohexane (0.112 moles) was added. After about 9 minutes, the reaction temperature was increase to about 60° C. and polymerization was allowed to continue for about 40 minutes. After 40 minutes, the reactor was cooled to about 40° C. and 20 g. (4 equivalents) of ethylene oxide was added. After 30 minutes, 16 g. (1.1 equivalents) of 2-ethylhexanol was added. GPC analysis indicated a number average molecular weight of 4,350 amu. and a polydispersity (Q, the ratio of weight to number average molecular weights) of 1.14. The number average molecular weights were measured using gel permeation chromatography (GPC) calibrated with polyisoprene standards having known peak molecular weights. The solvent for the GPC analyses was tetrahydrofuran.

An aliquot of the solution was vacuum dried to remove the solvent. 80 g. of the resulting polymer were added to a two liter extraction flask containing 720 ml of cyclohexane. A solution containing 1.0 g. of water and 6.5 g. of anhydrous methanesulfonic acid in 138 g. of isopropanol was then added. The resulting slightly hazy solution was stirred for 2 hours at about 50° C. The sample was washed with one aliquot of 1N aqueous potassium carbonate and two aliquots of DI water (about 750 ml each). 200 g. of isopropanol was added to aid in separation of the organic and aqueous phases. The pH of the aqueous phase after the fourth water wash was about 7. The polymer solvent was removed in a rotary evaporator, leaving a slightly yellow, clear liquid.

A 780 g. aliquot of the above polymer cement (15% solids in cyclohexane) was charged into a 4 liter high-pressure stainless steel autoclave, diluted to 7.5% solids by the addition of 780 g. of cyclohexane. The solution was heated to 40° C. and sparged with hydrogen for 30 minutes. The catalyst is prepared in advance by reacting nickel 2-ethylhexanoate with triethylaluminum in cyclohexane in amounts sufficient to give a ratio of 2.5 moles of aluminum to 1 mole of nickel. After sparging the reactor is then filled with hydrogen to a pressure of 700 psig. An initial aliquot of the Ni/Al catalyst solution, sufficient to bring the nickel concentration in solution to 400 ppm., is then pressured into the reactor. The reaction temperature is ramped to 75° C. over 30 minutes and held at this temperature for 2.5 hours with constant agitation. Total reaction time is 3 hours. Ozone titration indicated 96% hydrogenation of the butadiene unsaturation (final R.U.=0.47 meq/g).

The catalyst residues were extracted by contacting the resulting solution with 1.5% phosphoric acid in water at a volume ratio of 2 parts aqueous acid to one part polymer solution in a 3 l. resin kettle. After sparging the kettle with a mixture of oxygen and nitrogen, the solution was stirred for 20 minutes then allowed to settle. An emulsion formed after the first wash; isopropanol was added (25% by weight of the polymer solution) to break the emulsion. The aqueous acid layer was removed and the wash was repeated this time without the formation of an emulsion. The aqueous layer was removed.

A solution containing 1.0 g. of water and 4.45 g. of anhydrous methanesulfonic acid in 100 g. of isopropanol was then added to the washed polymer cement (523 g. at 7% solids). An additional 393 ml of cyclohexane and 162 gms of isopropanol were added. The resulting slightly hazy solution was stirred for 3 hours at about 60° C. The solution was washed without heating with 2 liters of 1N aqueous sodium hydroxide and two aliquots of DI water (about 2 liters each); the pH of the aqueous phase after the third water wash was about 7. The polymer solvent was removed in a rotary evaporator, leaving a colorless, slightly hazy liquid.

The 1,4-addition of polyisoprenes was measured by $^{13}$C NMR in chloroform solution. The functionality of the polymers was analyzed by High Performance Liquid Chromatography (HPLC) to determine the relative amounts of the desired dihydroxy material (diol), monohydroxy material (either capped with EO but not deprotected or deprotected but terminated by protic impurities) and non-functional material (protected—no EO incorporated). The HPLC separation was accomplished with a 250 mm×4.6 mm 5 micron DIOL phase column using a stepped heptane/tetrahydrofuran gradient. An evaporative light scattering detector is used to quantify the sample.

EXAMPLES 2 AND 3

The procedure of Example 1 was repeated twice using different ratios of initiator to monomer as follows:

| Example | Mn | Q | % 1,4 | % RU | OH/ Molecule | Viscosity Poise at 25° C. |
|---|---|---|---|---|---|---|
| 1 | 4,350 | 1.14 | 95.8 | 0.47 | 1.99 | 812 |
| 2 | 3,110 | 1.14 | 95.5 | 0.43 | 1.96 | 414 |
| 3 | 1,780 | 1.11 | 94.6 | 0.056 | 1.99 | 159 |

EXAMPLES 4, 5, 6 AND 7

Linear isoprene mono-ols having about one hydroxyl group per molecule were synthesized using s-butyllithium as the initiator in the absence of microstructure modifiers followed by capping with ethylene oxide. Neutralization of the polymeric alkoxide afforded the desired isoprene mono-ol.

In a dry box, under an inert nitrogen atmosphere, the initiator, s-BuLi (15.7 g of a 9.1% (wt/wt) solution of s-BuLi in cyclohexane, 0.025 mol) was dissolved in 400 g of polymerization grade cyclohexane. Isoprene monomer (98.8 g) was added to the initiator solution; the monomer addition was in aliquots of 20–30 g with sufficient time allowed between increments to keep the temperature of the polymerizing mixture below 50° C. When the polymerization of isoprene was complete, the living monolithiopolymer was capped by reaction with an excess of ethylene oxide (EO); EO was bubbled through the mixture until the yellow color of the living polymer dissipated. The alkoxide end groups were neutralized by addition on an excess of methanol (2 g). The polymer product was isolated from this solution by washing the lithium methoxide from the polymer with distilled water and the polymer was concentrated under vacuum with a rotary evaporator apparatus.

Analysis of the polymer product by GPC found the number average molecular weight to be 3,110; and a Q of 1.15. An NMR analysis technique found the 1,4-addition of isoprene to be 88% for this polymer and the functionality to be 0.81.

EXAMPLES 5, 6, AND 7

Using the procedure of Example 4 described above and the amounts of reagents noted below, three additional isoprene mono-ols were prepared having different molecular weight values as follows:

| Example Number | s-BuLi (mol) | Cyclohexane (g) | Isoprene (g) | MeOH (g) |
|---|---|---|---|---|
| 4 | 0.025 | 400 | 98.8 | 2 |
| 5 | 0.05 | 405 | 99.7 | 1 |
| 6 | 0.01 | 400 | 99.8 | 1 |
| 7 | 0.003 | 800 | 50 | 0.1 |

The analysis of these samples by GPC and NMR afforded the following data:

| Sample Number | Mn | Q | 1,4- Content by NMR | Functionality by NMR | Viscosity poise, 25° C. |
|---|---|---|---|---|---|
| 4 | 3,110 | 1.15 | 88% | 0.81 | 34 |
| 5 | 1,340 | 1.55 | 83% | 0.85 | 12 |
| 6 | 8,830 | 1.04 | 92% | 0.88 | 150 |
| 7 | 9,670 | 1.02 | 94% | 0.90 | 190 |

The low polydispersity, high 1,4-addition polyisoprene mono-ols of Examples 4–7 have much lower viscosities than either radical or other anionic isoprene mono-ols prepared by addition of microstructure modifiers.

COMPARATIVE EXAMPLE 1

For comparison with standard anionic polymerization techniques, linear isoprene diols were synthesized using a diinitiator followed by capping both ends with ethylene oxide. Neutralization of the polymeric dialkoxide afforded the desired isoprene diol. The diinitiator had been prepared by reaction of s-BuLi with diisopropenylbenzene (DIPB).

In a dry box, under an inert nitrogen atmosphere, DIPB (15.8 g, 0.1 mol) was dissolved in a diethyl ether (248 g)/cyclohexane (423 g) solvent mixture. Two equivalents of s-BuLi (141 g of a 9.1% (wt/wt) solution of s-BuLi in cyclohexane, 0.2 mol) were added per equivalent of DIPB in the original mixture to afford a deep red colored solution of the desired diinitiator. About 15 minutes after the addition of the s-BuLi reagent, isoprene monomer (151 g) was added to the diinitiator solution; the monomer addition was in aliquots of 30–40 g with sufficient time allowed between increments to keep the temperature of the polymerizing mixture below 50° C. When the polymerization of isoprene was complete, the living dilithiopolymer was capped by reaction with an excess of ethylene oxide (EO); EO was bubbled through the mixture until the yellow color of the living polymer dissipated. Addition of EO caused the solution to gel as the polymeric dialkoxide was formed. The alkoxide end groups were neutralized by addition on an excess of methanol (6.4 g). As the polymer alkoxide end groups were neutralized, the gel broke up affording a free flowing solution of the desired isoprene diol. The polymer product was isolated from this solution by removal of the lithium methoxide precipitate by filtration and concentration of the polymer under vacuum with a rotary evaporator apparatus.

Analysis of the polymer product by GPC found the number average molecular weight to be 1,300; and a Q of 1.62. An NMR analysis technique found the 1,4-addition of isoprene to be 38% for this polymer and the functionality to be 1.58.

COMPARATIVE EXAMPLES 2, 3, AND 4

Using the procedure of Comparative Example 1 described above and the amounts of reagents noted below, three additional isoprene diols were prepared having different molecular weight values as follows:

| Sample Number | DIPB (mol) | s-BuLi (mol) | Cyclohexane (g) | Diethyl Ether (g) | Isoprene (g) | MeOH (g) |
|---|---|---|---|---|---|---|
| C2 | 0.076 | 0.15 | 580 | 45 | 304 | 4.8 |
| C3 | 0.04 | 0.08 | 576 | 64 | 300 | 2.6 |
| C4 | 0.025 | 0.05 | 360 | 40 | 100 | 4.0 |

The analysis of these samples by GPC and NMR afforded the following data:

| Sample Number | Mn | Q | 1,4- Content by NMR | Functionality by NMR |
|---|---|---|---|---|
| C2 | 2,410 | 1.77 | 60% | 1.94 |
| C3 | 5,470 | 1.43 | 57% | 1.98 |
| C4 | 3,800 | 1.36 | 54% | 1.86 |

The low polydispersity, high 1,4-addition hydrogenated polyisoprene diols of Examples 1–3 have much lower viscosities than either radical or other anionic (e.g. initiated by DiLi or Li naphthalene in THF) hydrogenated isoprene diols as shown in FIG. 2. The corresponding unsaturated isoprenes follow the same trend as shown in FIG. 1. The data in FIGS. 1 and 2 show that the mono-ol that contains the silyl protected hydroxyl is surprisingly lower in viscosity than the diol after deprotection.

The hydrogenated polyisoprene diols of the present invention are significantly and surprisingly lower in viscosity than Nisso's hydrogenated polybutadiene diol (Polytail HA) as shown in FIG. 2.

For comparison, the data shown in FIGS. 1 and 2 is included in the following Table:

| # | Polymer | Type | MW | Viscosity Poise, 25° C. | Functionality |
|---|---|---|---|---|---|
| 1 | EP | PFI Diol | 4,350 | 812 | 1.99 |
| 2 | EP | " | 3,110 | 414 | 1.96 |
| 3 | EP | " | 1,780 | 159 | 1.99 |
| ATOCHEM | EPOL | Radical EP Diol | 2,500 | 1,200 | 2.25 |
| KURARAY (KENSEIKA) | TH-21 | EP Diol | 2,600 | 1,430 | 2.6 |
| NISSO | TH-11 | EP Diol | 5,500 | 9,000 | 2.2 |
| NISSO | POLYTAIL HA | Anionic EB Diol | 1,900 | 1,650 | >1.6 |
| Mitsubishi | GI-2000 | | 1,900 | 1,605 | >1.6 |
| 1 | Isoprene | PFI Diol | 4,350 | 65.3 | 1.96 |
| 2 | | | 3,110 | 49.4 | 1.95 |
| 3 | | | 1,780 | 28.7 | 1.91 |
| C1 | Isoprene | Di-init. | 1,300 | 178 | 1.58 |
| C2 | | Anionic | 2,410 | 376 | 1.94 |
| C3 | | Diol | 5,470 | 1680 | 1.98 |
| C4 | | | 3,800 | 887 | 1.86 |

The hydrogenated isoprene diol made by the present invention has significantly lower viscosity than commercial hydrogenated isoprene diols and is advantaged over hydrogenated butadiene diols both in viscosity for high 1,2 addition butadiene polymers and in viscosity and clarity for low 1,2 addition butadiene polymers. The polyisoprene diol of the present invention has lower viscosity than the corresponding diol made by diinitiation.

We claim:

1. A functionalized polymer, comprising: polymerized isoprene having a number average molecular weight from 1,000 to 20,000, greater than 80% 1,4-addition of the isoprene, a polydispersity less than 2, hydrogenation of at least 90% of the polymerized isoprene and from about one to two terminal hydroxyl groups per molecule.

2. The polymer of claim 1, wherein the polymer has a polydispersity less than 1.5.

3. The polymer of claim 2, wherein the polymer has greater than 90% 1,4-addition and from 1.6 to 2.0 terminal hydroxyl groups per molecule.

4. The polymer of claim 1, wherein the polymer has a number average molecular weight from 1,000 to 9,000, greater than 90% 1,4-addition of the isoprene, and a polydispersity less than 1.5.

5. The polymer of claim 4, wherein the polymer has a number average molecular weight from 1,500 to 4,500, hydrogenation of at least 95% of the polymerized isoprene, and from 1.6 to 2.0 terminal hydroxyl groups per molecule.

6. A functionalized polymer, produced by a process comprising the steps of:
   initiating polymerization of isoprene at a temperature from 20° C. to 60° C. with a lithium initiator having the structure $R^1R^2R^3Si$—O—A'—Li wherein $R^1$, $R^2$, and $R^3$ are independently alkyl, alkoxy, aryl, or alkaryl groups having from 1 to 10 carbon atoms, and A' is independently a branched or straight chain bridging group having at least 2 carbon atoms;
   hydrogenating the polymerized isoprene; and
   recovering a linear polymer having from about one to two terminal functional groups per molecule.

7. The polymer of claim 6, wherein the lithium initiator has the structure

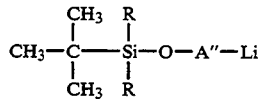

wherein each R is methyl, ethyl, n-propyl, or n-butyl and A" is an alkyl-substituted or non-substituted propyl bridging group or an alkyl-substituted or non-substituted octyl bridging group.

8. The product of claim 7, further comprising the step of reacting the polymer with ethylene oxide prior to recovering the polymer.

9. The product of claim 8, further comprising the step of reacting the recovered polymer with methanesulfonic acid to convert silyl ether groups to hydroxyl groups.

10. The product of claim 9, wherein each R is methyl and A" is non-substituted propyl or non-substituted octyl.

11. The product of claim 6, wherein the lithium initiator has the structure

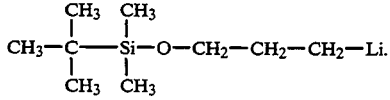

* * * * *